United States Patent Office 3,534,531
Patented Oct. 20, 1970

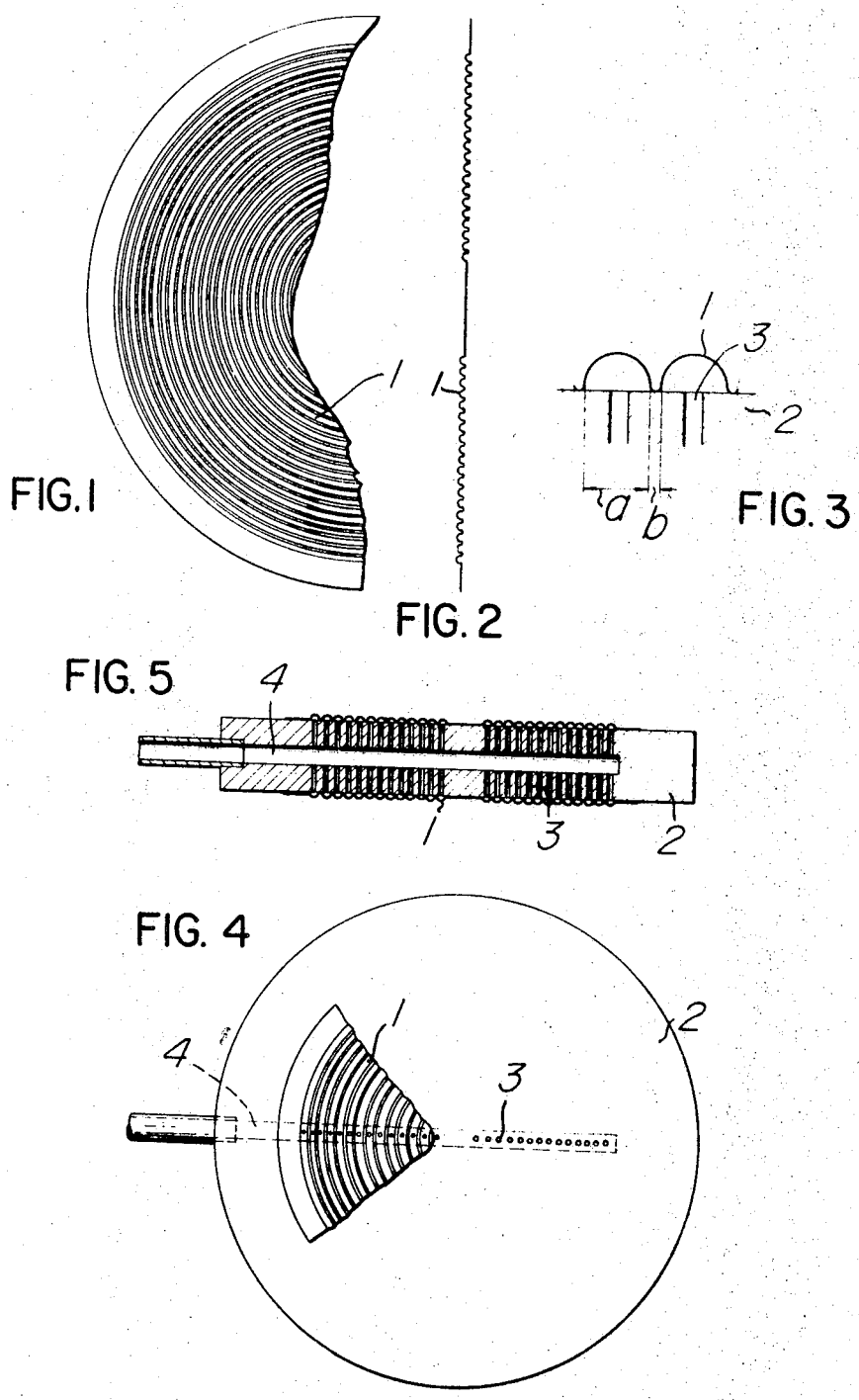

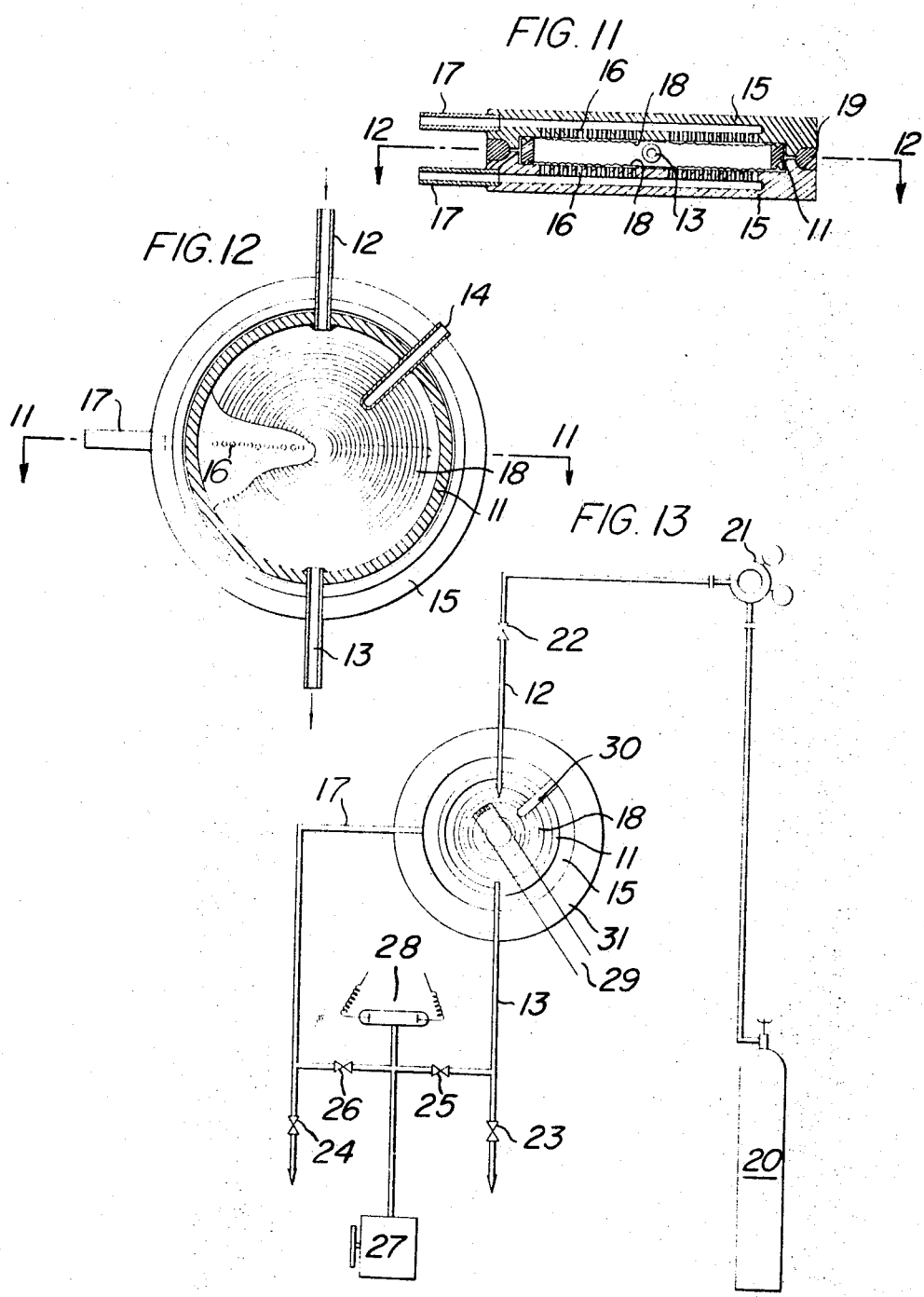

3,534,531
ASSEMBLY OF PURE GAS PERMEATING SEPARATOR
Takashi Eguchi, Chigasaki-shi, and Teruchika Taura, Machida-shi, Japan, assignors to Japan Pure Hydrogen Co., Ltd., Yokohama, Japan, a corporation of Japan
Continuation of application Ser. No. 634,775, Apr. 28, 1967, which is a continuation of application Ser. No. 393,103, Aug. 31, 1964. This application July 3, 1968, Ser. No. 749,902
Claims priority, application Japan, Aug. 31, 1963, 38/46,843; Jan. 20, 1964, 39/2,395; Feb. 10, 1964, 39/6,779; Mar. 18, 1964, 39/14,980
Int. Cl. B01d 53/22
U.S. Cl. 55—158　　　　　　　　　　　　　　　　7 Claims

ABSTRACT OF THE DISCLOSURE

An apparatus for separating a pure gas from a mixture of gases comprising a membrane, having a wave form cross-section permeable to the pure gas. The surface of a support member in contact with the membrane is coated with a material selected from the group consisting of silver, copper, nickel, cobalt and iron. A second portion is coated with a member selected from the group consisting of chromium, molybdenum, tungsten, titanium, zirconium, hafnium, aluminum and oxides thereof.

---

This application is a continuation of application 634,775 filed Apr. 28, 1967, now abandoned, which is a continuation of application 393,103, filed Aug. 31, 1964 and now abandoned.

This invention relates to pure gas permeating separator assemblies.

It is well known that membranes of palladium and its alloys permeate selectively hydrogen gas alone and silver and its alloys permeate selectively oxygen gas alone. The mechanism of permeation in these cases is that molecular permeating gas dissociates into atomic state on the surface of these metals and alloys, passes through the membranes in the atomic state and then returns to the gaseous molecular state.

Accordingly it is entirely different from filtration or separation which is carried out by the difference of size of molecular gas.

In these cases, it is known that the amount of permeated pure gas is (1) inversely proportional to the thickness of membrane of the metal or alloy used,
(2) proportional to the permeating surface area of the membrane,
(3) and proportional to the difference of root partial pressures of the permeating gas on either side of the membrane.

In the past when membranes of these metals and alloys were to be used in separating apparatus for pure gas, they were processed into pipes or capillaries by cold drawing through dies, extrusion, forge welding, drawing, etc., or they were placed upon or inlaid upon a support of sintered metals.

However, pipes made by cold drawing or extrusion have the disadvantage of being subject to drawing flaws in the longitudinal direction which frequently incur cracks. Pipes made by forge welding are not uniform in their thickness and are liable to produce processing creases, flaws and breaches and to bend while hot. Drawing requires a number of steps from light drawing gradually extending to deep drawing until pipes are produced and moreover it necessitates such troublesome operations as vacuum tempering at every step together with a great deal of labour.

Pipes made by any one of the above mentioned processing methods have further disadvantage in that when the pipes are lengthened to increase the permeation area, they cannot withstand vibration and when they are formed with a large diameter, their pressure resistance becomes small. As shown in U.S. Pat. No. 2,824,620, a permeable membrane placed upon a support of sintered metal produced creases at high temperatures due to thermal expansion, and by repeated heating and cooling, these creases developed into cracks. Moreover, since the permeating gas must pass through the sintered metal plate, the amount which actually permeates is greatly reduced Further when gas containing a large amount of non-permeating gas was used, conventional pure gas separators using pure gas permeable membranes were used with a great number of them connected in series since the efficiency of a single pure gas permeating separator was not sufficient.

Still further in a conventional pure gas separator using permeable membranes, it frequently happened that the gas permeable part became fatigued by diffusion at the parts joined to supporting members. For example, when hydrogen containing another inpure gas is treated using a palladium alloy membrane at a temperature ranging from 400° to 500° C., because of the high purity of permeated hydrogen, the sintered iron or iron alloy supporting the membrane readily lost its oxide coating, causing mutual diffusion which incurs fatigue and loss of the palladium alloy membrane and naturally brought about the reduction of permeating capacity.

An object of the present invention is, accordingly, to provide a pure gas separator assembly using permeable membranes which overcome the above-mentioned disadvantages of conventionally fabricated membranes.

According to the present invention, there is provided a pure gas separator assembly comprising at least one metal or metallic alloy membrane which is permeable to the said pure gas, and of wave form cross-section, each such membrane being carried on the suface of at least one supporting member having gas conduits passing therethrough and terminating at said surface and which are in fluid communication with one side of each membrane.

The wave form of the membrane in the present invention consists of continuous or discontinuous grooves impressed in the membrane in the form of concentric arcs or straight lines and the cross-section of the grooves may be of various forms e.g. half-circular, half elliptical or parabolic. The wave forms also include spaced hemispherical protuberances, ellipsoidal or paraboloidal, concave or forms. The pitch of the wave form, i.e., the distance between corresponding parts of adjacent grooves, can be varied according to the thickness of the membrane of metal or alloy, but from the practical point (pressure), the pitch of the wave form is preferably 0.5–10 millimeters. The thickness of the pure gas permeable membrane of the present invention is preferably form 0.03–0.1 millimeter. Supporting members fixing the permeable membrane must allow gas to pass freely therethrough. They may be formed of metals having suitable pure gas passage holes or grooves, or of sintered metal or porcelain capable of passing gases therethrough. The diameter of the holes or grooves of the pure gas conduits may be shorter than the pitch of the associated wave form.

In assemblies of the pure hydrogen gas separator of the present invention, the hydrogen permeable membrane may be formed of a palladium-silver alloy and palladium alloy containing elements of group VIII of the Periodic Table other than palladium and elements of group Ib of the Periodic Table.

The gas permeable membrane of the present invention has the following advantages compared with conventional membranes.

(1) Fabrication of the wave form metal or alloy can be accomplished very easily and in a short time by use of a hydraulic press or rubber projecting press at ordinary temperatures.

(2) There are no cracks, flaws or creases produced by fabrication and even without annealing, products having sufficient tenacity can be obtained.

(3) When a half-circular wave form membrane is made from a flat plate by pressing, the surface area of wave form part is enlarged 1.57 times the original area and the thickness is reduced $1/1.57$ times the original thickness whereby the permeating amount of pure gas can be increased about $(1.57)^2$ times.

(4) Pressure resistance can be increased remarkably when fabricated into a wave form membrane having a pitch of the order of several millimeters. For example a palladium alloy membrane (containing 86 percent by weight of palladium) fabricated to give 0.1 mm. thickness and a wave form pattern of 1 mm. diameter, attached to a suitable supporting member having pure hydrogen gas passage holes, was not deformed or broken even under a pressure or 200 kg./cm.$^2$ at ordinary temperature, withstood a pressure as high as 100 kg./cm.$^2$ even at a temperature of from 400° C. to 500° C., and did not create creases and cracks by expansion and contraction even when heating and cooling, and raising and lowering of pressure were repeated. This is due to the expansion release of wave form part.

(5) Since resistance to deformation under pressure at a high temperature is high, it is possible to make the pressure difference of raw gas and pure gas larger so that the amount of permeating gas can be made greater than that in the case of flat membranes.

(6) Since the membranes of the present invention have greater strength against shock or vibration, they are not only easier to handle and transport but also they can be made into larger sized apparatus, suitable for mass production of pure gas.

The use of the pure gas separator of the present invention will be explained referring to the drawings in which:

FIG. 1 is a plan view partly cut away of an alloy membrane having wave form canals arranged in concentric circles;

FIG. 2 is a cross sectional view of the membrane of FIG. 1;

FIG. 3 is a fragmentary cross sectional view on a greatly enlarged scale of the membrane shown in FIGS. 1 and 2 and showing also a portion of the supporting member;

FIG. 4 is a plan view of a gas permeating separator with the membrane partly cut away;

FIG. 5 is a cross sectional view of the separator of FIG. 4;

FIG. 11 is a horizontal sectional view of a gas permeating separator assembly taken along line 11—11 of FIG. 12;

FIG. 12 is a horizontal sectional view with parts cut away taken along line 12—12 of FIG. 11;

FIG. 13 is a schematic diagram showing the gas flow system of the separator assembly of FIGS. 11 and 12;

FIG. 1 shows a palladium alloy membrane 1 (consisting of 80 percent by weight of palladium) having a diameter of 130 mm. and thickness of 0.1 mm., fabricated by means of a hydraulic press to give a half-circular wave form cross-section, arranged in concentric circles and for use in hydrogen gas permeation.

Figure 6:
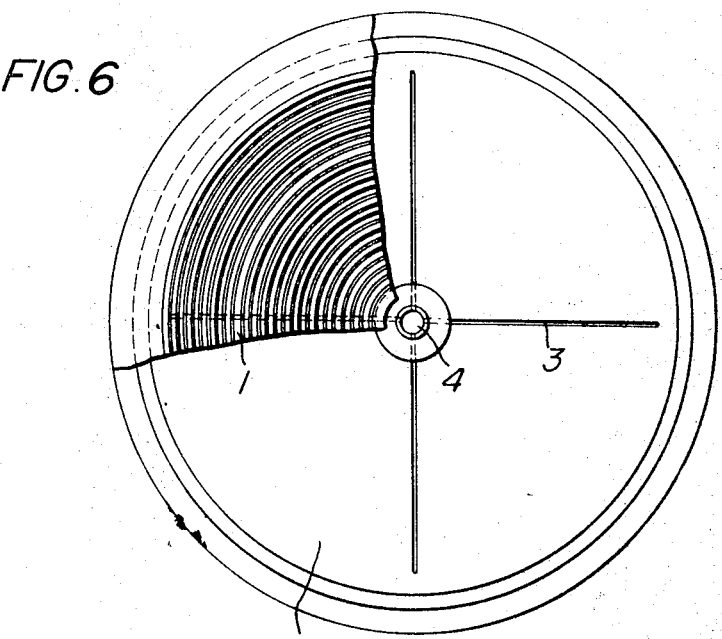
FIG. 6 is a plan view of another gas permeating separator with the membrane partly cut away.
Figure 7:
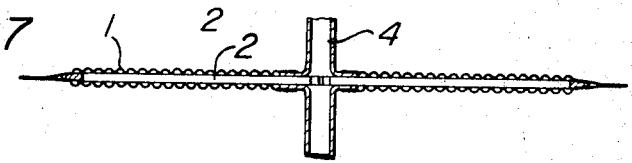
FIG. 7 is a cross sectional view of the separator of FIG. 6.
Figure 8:
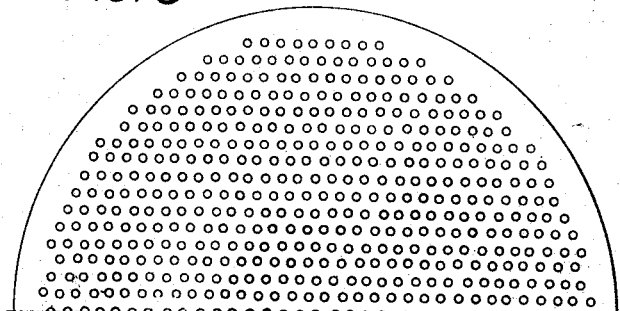
FIG. 8 is a plan view partly cut away of an alloy membrane having wave forms arranged as spaced hemispherical protuberances.
Figure 9:
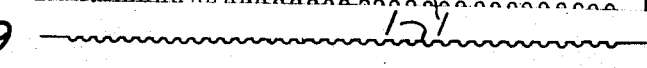
FIG. 9 is a cross sectional view of the membrane of FIG. 8.
Figure 10:
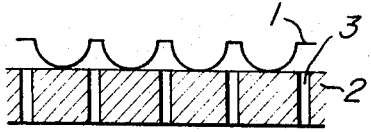
FIG. 10 is a fragmentary cross sectional view on a greatly enlarged scale of the membrane shown in FIGS. 8 and 9 and showing also a portion of the supporting member.

Details of dimension are as follows:

Diameter of wave form palladium alloy membrane: 130 mm.
Diameter of half-circular wave $(a)$: 1.2 mm.
Pitch of wave $(a+b)$: 1.6 mm.
Permeating area of membrane: 161 cm.$^2$
Mean thickness of membrane: 0.067 mm.

This membrane is fixed to a pressure resistant supporting member 2 having suitable gas passage holes 3 and subjected to a pressure resisting test by applying pressure from the unsupported side. Results are shown in the following table.

| Result of hydraulic pressure test at ordinary temperature | | | | Result of pressure resistance test at high temperature | | | |
|---|---|---|---|---|---|---|---|
| Pressure (H$_2$O) kg./cm.$^2$ | Temperature, °C. | Time, hours | Pressure resistance | Pressure, (N$_2$ gas) kg./cm.$^2$ | Temperature, °C. | Time, hours | Pressure resistance |
| 10 | 21 | 5 | Passed | 5 | 500±2 | 5 | Passed. |
| 25 | 21 | 5 | do | 10 | 500±2 | 5 | Do. |
| 50 | 21 | 5 | do | 30 | 500±2 | 5 | Do. |
| 75 | 21 | 5 | do | 40 | 500±2 | 5 | Do. |
| 100 | 21 | 5 | do | 60 | 500±2 | 5 | Do. |
| 125 | 21 | 5 | do | 80 | 500±2 | 5 | Do. |
| 150 | 21 | 5 | do | 100 | 500±2 | 5 | Do. |
| 175 | 21 | 5 | do | | | | |
| 200 | 21 | 5 | do | | | | |

FIGS. 6–10 show essential parts of a hydrogen gas permeating separator consisting of palladium alloy membranes 1 fabricated as described above and a supporting member 2 having a plurality of gas passage holes or canals 3. Raw gas containing hydrogen gas heated to a temperature of 450° C. contacts the permeable membranes 1 from their outside and only hydrogen can permeate through the membranes. Permeated hydrogen gas then passes through canals 3 of supporting member 2 and is exhausted from gas outlet pipe 4.

As practical assemblies in which the gas permeable membrane of metal or alloy of the present invention are utilized, there are several kinds which can be used advantageously.

In one such assembly, pure gas permeable membranes (e.g. palladium alloy membranes shaped to have a continuous or discontinuous wave form cross section) are arranged on both sides of a metallic spacer and a charging pipe, a purging pipe and a thermocouple inserting pipe are mounted in said spacer at its side. The spacer combined with the membranes is clamped between two supporting members having pure gas passage holes and gas outlets and the outer peripheries of the supporting members are sealed together by welding or clamping.

The above-described pure gas separator assembly has the following advantages.

(1) It can withstand high pressure and vibration shock.

(2) Since the permeable membranes and shell are strong, the life of the apparatus is long.

(3) A large amount of pure gas can be produced from an apparatus of small volume.

(4) Since the construction is simple, the fabrication is easy.

(5) Since the shells are of plate form, they may be assembled in layers, can easily be put into a small case, and it is possible to connect several sets of these assemblies in series by piping for use in concentrating non-permeating gas (impure purge gas). Such an arrangement is extremely simple when compared with other methods e.g. palladium pipe, etc.

Details of the above-mentioned assembly will be further explained by referring to the drawings.

In FIGS. 11–17, metallic spacers 11 (Cr. Mo steel or 18–8 stainless steel) are provided with raw gas charging pipes 12 (18–8 stainless steel), impure gas purging pipes 13 (18–8 stainless steel) and thermocouple inserting pipes 14 (18–8 stainless steel). Supporting members 15 (Cr. Mo steel or 18–8 stainless steel) are provided with pure gas passage holes 16 and pure gas take out pipes 17 (18–8 stainless steel), and carry pure gas permeable membranes 18 (Pd alloy membranes). Reference numeral 19 shows the welded peripherical part of supporting members 15. FIG. 13 illustrates a hydrogen bomb 20 connected via a pressure controlling valve 21 and a raw gas feeding valve 22 to pipe 12. Pipe 13 discharges through valve 23 for purging impure gas. 24 is a valve for taking out pure gas through pipe 17. Vacuum valve 25 on the impure gas side and pure gas side vacuum valve 26 are connected to vacuum pump 27 and a Geisler tube 28. Reference numeral 29 indicates sheath heaters (e.g. 750 w.). A thermocouple 30 is inserted in tube 14 and the assembly is surrounded by heat insulating material 31. In fabricating the above-mentioned gas separator assembly, holes are bored at the side of metallic spacer 11 and raw gas charging pipe 12, impure gas purging pipe 13 and thermocouple inserting pipe 14 are attached in said holes by welding.

Pure gas passage holes 16 are bored in the supporting member 15 and, pure gas take-out pipes 17 are welded in place. Pure gas permeable membranes 18 shaped in continuous or discontinuous wave form are put upon both sides of metallic spacers 11, clamped by supporting members 15 and in the pressed condition a leak test is conducted under vacuum.

In conducting the leak test in the arrangement of FIG. 13 raw gas charging valve 22 is opened to the atmosphere, while impure gas purging valve 23, and pure gas take-out valve 24 are closed. While starting the operation of vacuum pump 27 the charge side vacuum valve 25 and pure gas side vacuum valve 26 are opened. By evacuating until the degree of vacuum reaches $1 \times 10^{-3}$ mm. Hg i.e. until the discharge color of the Geisler tube becomes green, a thorough examination for leakage is conducted.

After it is confirmed that no leakage is detected at spacers 11, supporting parts 15, pure gas permeable membrane 18 and the like, the periphery of the supporting member is welded at 19 to complete fabrication of the pure gas separator assembly.

Figure 18:
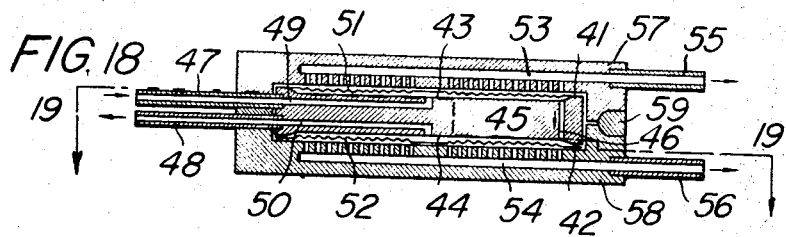
FIG. 18 is a horizontal cross sectional view of still another separator assembly.
Figure 19:
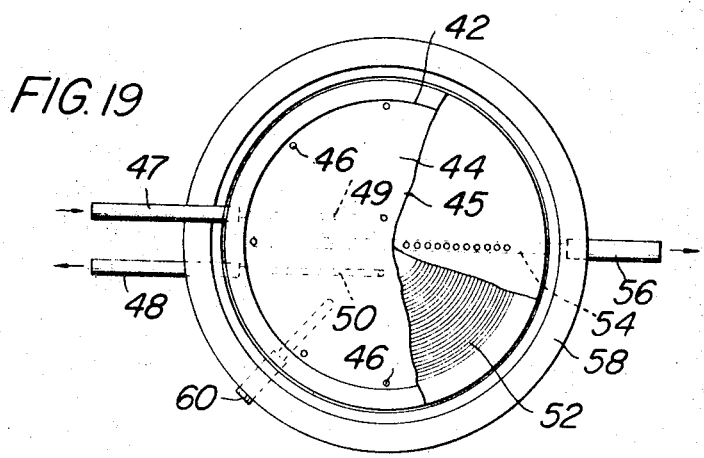
FIG. 19 is a horizontal sectional view taken along the line 19—19 of FIG. 18.
Figure 20:
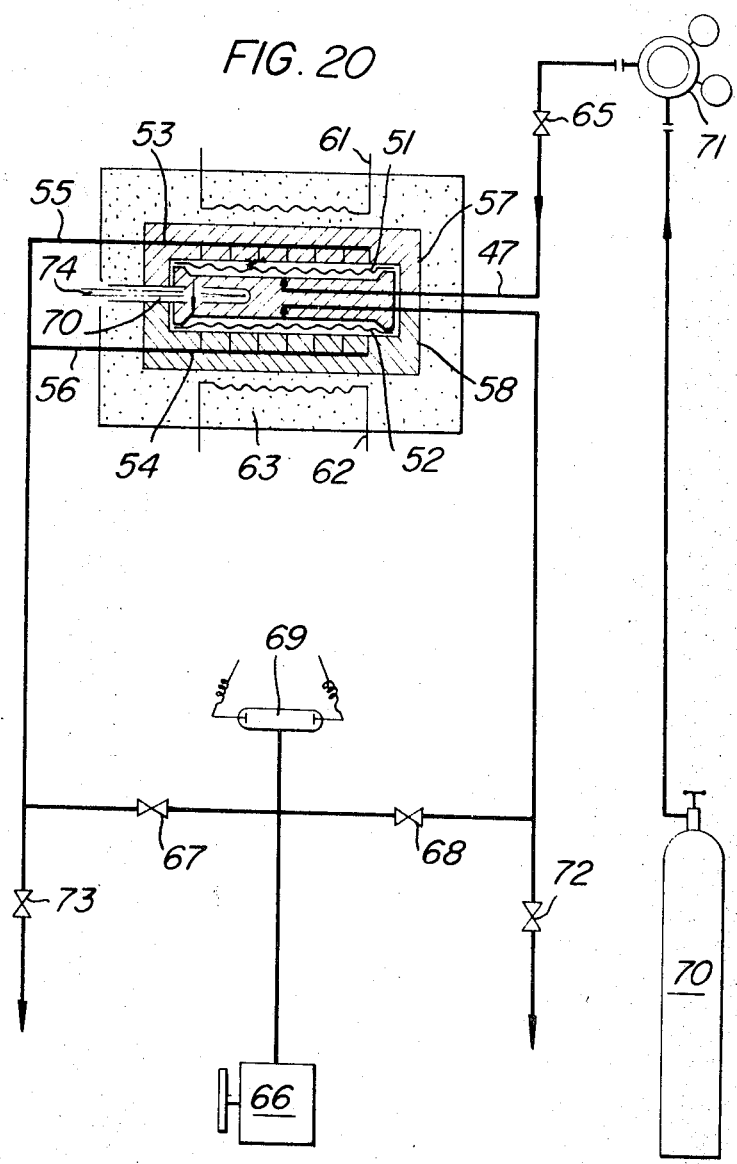
FIG. 20 is a schematic diagram showing the gas flow system of the separator assembly of FIGS. 18 and 19.

Details of another assembly according to the present invention will be further explained by referring to FIGS. 18–20 of the drawings.

A circular shaped inside supporting member 45 having peripherical parts 41 and 42 of suitable width and height and concave surfaces 43 and 44 is made and a suitable number (8–16) of raw gas communicating holes 46 having suitable diameter (2–4 mm.) are bored in the neighborhood of the outer periphery of the two concave surfaces. A raw gas charging conduit 49 and an impure gas purging conduit 50 are bored from the side to the central part of supporting member 45. At the side of member 45 the above mentioned conduits are connected with a raw gas charging pipe 47 and an impure gas purging pipe 48 by welding while at the central part of member 45, the conduits 49 and 50 are opened to mutually opposed concave surfaces 43 and 44. Pure gas permeable membranes 51 and 52 having a continuous or discontinuous wave form which conform to both the sides of supporting member 45 are clamped by outside supporting members 57 and 58 equipped with pure gas passage holes or canals 53 and 54 and pure gas withdrawal pipes 55 and 56. The outer peripheries 19 of the confronting supporting members are welded at 59. Holes are bored at the sides of outside supporting members 57 and 58 and inside supporting member 45 to fix thermocouple insert pipe 60.

In operation, in passing through raw gas charging pipe 47 and charging hole 49, raw gas reaches the surface of the wave-form permeable membrane 51, flows through the shallow passageway between membrane 51 and the inside supporting member 45, passes through raw gas communicating holes 46 reaches the pure gas permeable membrane 52 on the opposite side, flows through the shallow passageway between the pure gas permeable membrane 32 and the inside supporting member 45 and is exhausted from impure gas purging conduit 30 and purging pipe 48. On the other hand, pure gas permeates through permeable membranes 51 and 52 and is taken out from pure gas conduits 53 and 54 and pure gas take-out pipes 55 and 56.

In constructing a complete pure gas permeating separator assembly, heaters 61 and 62 are placed near the outsides of outside supporting members 57 and 58 which are wrapped with heat insulating material 63, a thermocouple is inserted into pipe 60, distributing wires are connected to thermocouple 64, heaters 61 and 62 and an automatic temperature regulator, and pipings are laid as shown in FIG. 20.

In operating the apparatus by closing raw gas charging valve 65, starting the operation of vacuum pump 66, opening the pure gas side vacuum valve 67 and raw gas side vacuum valve 68, evacuation of the inside of the pure gas permeating separator assembly is performed until the vacuum degree reaches $1 \times 10^{-3}$ mm. Hg i.e. the discharge color of Geisler tube 69 becomes green. By passing electric current through heaters 61 and 62, the pure gas permeating separator assembly is heated to a predetermined temperature. Closing vacuum valves 67 and 68, stopping operation of vacuum pump 66 and opening valve 65, raw gas is forced into the pure gas permeating separator assembly from a raw gas bomb 70 through a pressure regulating valve 71, raw gas charging valve 65 and raw gas charging pipe 47. While purging impure gas through valve 72, pure gas take out valve 73 is opened, and only pure gas permeates through membranes 51 and 52, passes through conduits 53 and 54 and flows continuously out of withdrawal pipes 55 and 56.

Since the passageway between the pure gas permeable membranes and the inside supporting member and between the pure gas permeable membranes and the inside surface of the supporting member are such that the gases traverse lengthly flow paths according to the above-mentioned apparatus, it is possible to separate and collect pure gas even from raw gas containing large amounts of non-permeating gas with high yield and simultaneously possible to concentrate the non-permeating gas in the raw gas to high degree. This embodiment of pure gas permeating separator assembly is most suitable for collecting pure hydrogen.

In order that the permeable portion of the pure hydrogen permeable membrane does not diffuse into and join with the supporting members at elevated temperatures and thereby cause fatigue and loss, it is advantageous to form the joint other than by soldering or welding, while simultaneously paying special attention to the adjoining parts. Thus it is advantageous to coat the surfaces of supporting members which contact the permeable portion of the membrane with a substance with which mutual diffusion with the pure hydrogen permeating membrane is difficult, e.g., with Cr, Mo, W, Ti, Zr, Hf, Al, etc. or an oxide thereof and to coat the surfaces of supporting members contacting with the clamping parts of the membrane with a substance with which mutual diffusion with the membrane is enhanced e.g. one metal or alloy of one or more of An, Ag, Cu, Ni, Co, Fe, etc. and to clamp the membrane with the supporting member thus coated, and avoiding contact between the permeable portion of the membrane contacting with the contacting supporting member while causing the clamping part of the membrane to effectively contact with the adjoining part of the supporting member.

By the above-mentioned method, it has now become possible to prevent the oxide coating of the surface of supporting member for the membranes from being reduced easily by an iron or iron alloy contacting the membrane due to the high purity of the hydrogen permeated through the membrane at a temperature ranging from 400° C. to 500° C., which would normally cause mutual diffusion and fatigue and loss of the palladium alloy membrane.

In forming various metal coatings on the surface of the supporting member, such methods as plating, coating by condensation of metal vapor, metal spraying, cementation, cladding of coating metal foil, etc. can be used. It is preferable to convert the metal coating of the surface contacting the permeating part of the membrane to oxide which is not reduced by pure hydrogen at temperatures of from 400° C. to 500° C. at which the membrane is used.

Figure 21:
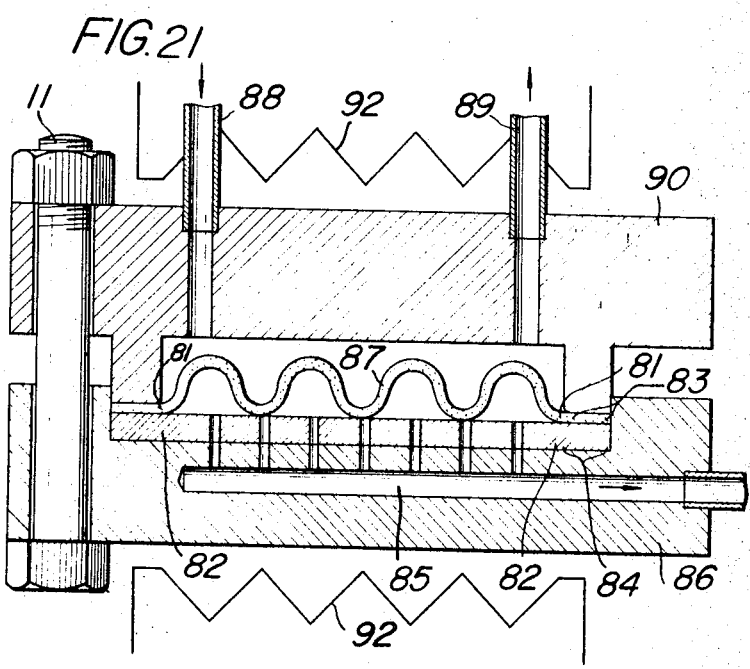
FIG. 21 is a cross sectional view on an enlarged scale of another form of gas permeating separator assembly according to the present invention.

Referring now to FIG. 21, one metal selected from the group consisting of Cr, Mo, W, Ti, Zr, Hf, Al, or an oxide thereof is coated on portion of surface 82 of supporting member 86 contacting with the permeable portion 81 of membrane 87 composed of Pd, Au, or Ag. One or more than one alloy composed of Au, Ag, Cu, Ni, Co, Fe, are coated on portion 84 of surface 82 of supporting member 84 which contacts with clamping part 83 of membrane 87. Membrane 87 is placed in supporting member 86 on the pure hydrogen take off side, which is equipped with pure hydrogen passage 85. Supporting member 90 on the raw hydrogen feed side, equipped with raw hydrogen inlet pipe 88 and impure gas outlet pipe 89 is superposed on supporting member 86 and secured by bolts 91 and heaters 92 are fixed to the outer surfaces of the completed assembly. It is preferable to also coat supporting member 90 as described above with regard to supporting member 86.

A more comprehensive understanding of the invention can be obtained by referring to the following illustrative examples which are not intended, however, to unduly limit the invention.

EXAMPLE 1

Using pure hydrogen permeable membranes of palladium alloy composed of Pd 74.5%, Au 5%, Ag 20%, and Ru 0.5%, having a thickness of 0.1 mm., diameter of 160 mm., wave pitch of 2 mm., an effective permeating surface of 261 cm.$^2$ and shaping them into continuous wave-formed membranes having a mean thickness of 0.067 mm. a pure hydrogen permeating assembly was fabricated as illustrated in FIGS. 11–13. Sheath heaters 29 were fixed along the outer surfaces of supporting member 15 and by inserting a thermocouple 30 in the thermocouple inserting pipe 14, and by connecting an automatic temperature regulator to the thermocouple and the sheath heater, the temperature of membrane 18 was arranged to be maintained automatically 450° C.±5° C. After fabrication as in FIG. 13 is completed, raw gas charging valve 22, impure gas purging valve 23 and pure gas take-out valve 24 were closed and after starting the operation of vacuum pump 27, vacuum valves 25 and 26 on the pure hydrogen side and on the charging side were opened. After evacuating until the degree of vacuum in the inside of the assembly reaches $1 \times 10^{-3}$ mm. Hg i.e. until the discharging color of Geisler tube 28 became green, sheath heater 29 was connected to electric current to start heating. When the temperature of membrane 18 reached 450° C.±5° C., vacuum valves 24 and 25 were closed, vacuum pump 27 was stopped, raw gas charging valve 22 was gently opened to force impure raw gas from bomb 20 into the inside of metallic spacer 11 through raw gas charging pipe 12. While purging impure gas through the suitably opened impure gas purging valve 23, only pure hydrogen was passed through the pure gas permeable membrane 18. Pure hydrogen was taken out continuously via the pure hydrogen passage conduit 16 from the pure hydrogen outlet 17.

Operating as above-mentioned, the result of a long range continuous test for durability are shown in the following table.

TABLE

| | | | | |
|---|---|---|---|---|
| Raw hydrogen charge pressure (atm.) | 10 | 20 | 30 | 50 |
| Raw hydrogen take-out pressure (atm.) | 1 | 1 | 1 | 1 |
| Heating temperature of pure gas permeable membrane (° C.) | 450±5 | 450±5 | 450±5 | 450±5 |
| Amount of raw hydrogen charged (l./hr.) | 810 | 1,250 | 1,560 | 2,144 |
| Pure hydrogen yield (l./hr.) | 648 | 1,000 | 1,248 | 1,716 |
| Amount of impure gas purged (l./hr.) | 162 | 250 | 312 | 428 |
| Purity of raw gas (percent) | 99.5 | 99.5 | 99.5 | 99.5 |
| Purity of pure hydrogen (percent) | 99.99999 | 99.99999 | 99.99999 | 99.99999 |
| Continuous operating time (hr.) | 4,000 | 4,000 | 4,000 | 4,000 |
| Accident during the operation | None | None | None | None |

Although in the above example palladium alloy membranes were used for permeating pure hydrogen, the same apparatus could be used having silver alloy membranes for pure oxygen or molybdenum alloy membranes for pure nitrogen.

Figure 14:
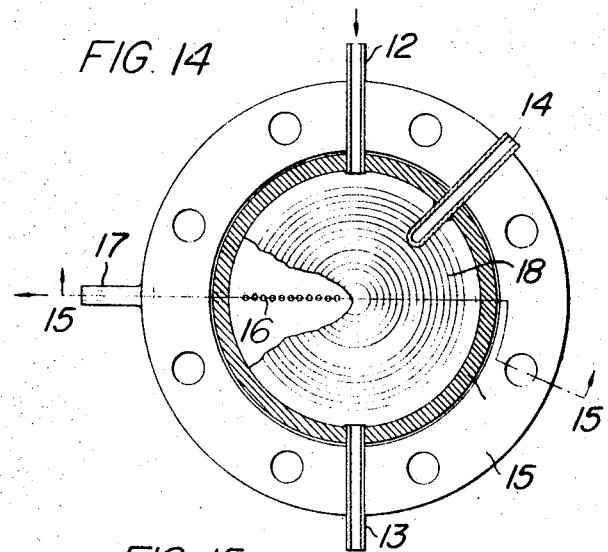
FIG. 14 is a horizontal sectional view with parts cut away of another gas permeating separator assembly taken along line 14—14 of FIG. 15.
Figure 15:
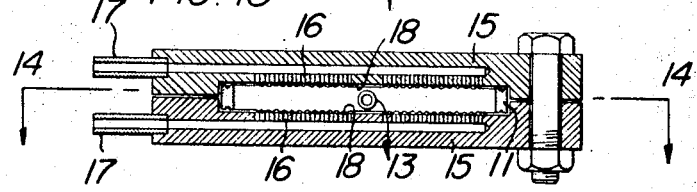
FIG. 15 is a horizontal view taken along line 15—15 of FIG. 14.
Figure 16:
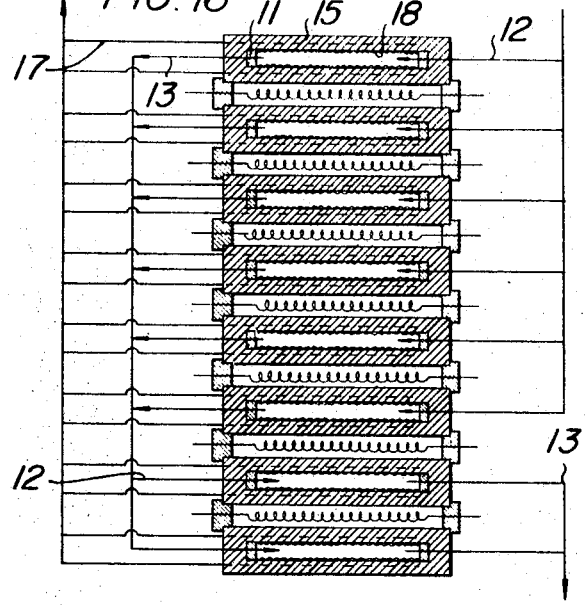
FIG. 16 is a schematic vertical cross sectional view showing the gas flow of a plurality of gas separator assemblies connected in series.
Figure 17:
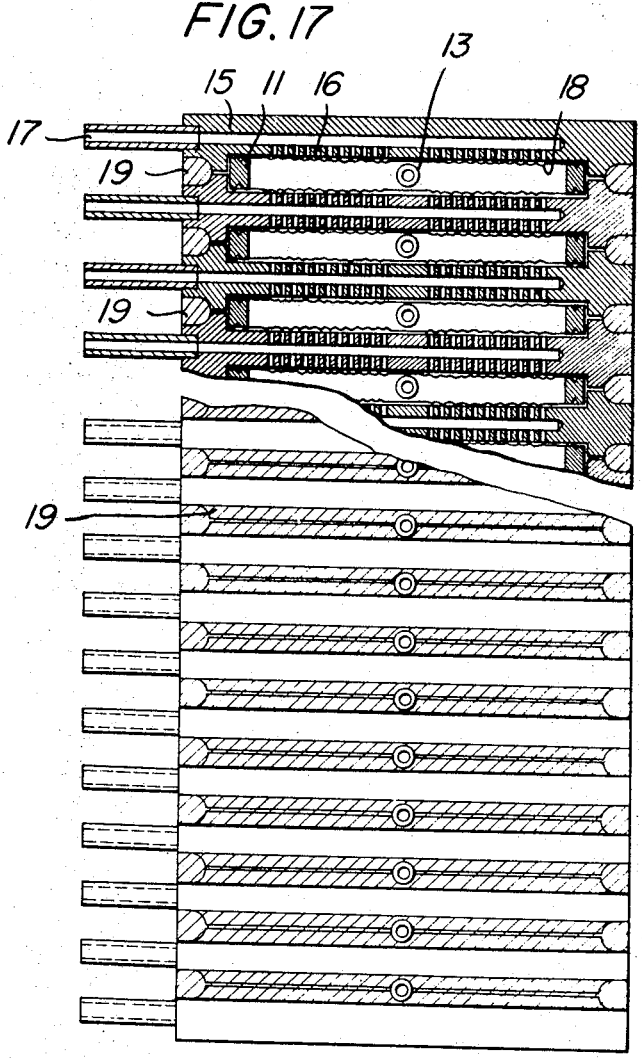
FIG. 17 is an elevational view partly in section of a plurality of gas separator assemblies, the peripheries thereof being sealed together by welding.

In fixing pure gas permeable membranes by a supporting member, it is possible to use both welding as in FIGS. 11 and 12 and bolt-securing methods as in FIGS. 14 and 15. Not only single permeating separator assemblies but also a plurality of parallel or series separator assemblies connected by pipings can be used for obtaining a large volume of pure gas or for concentrating impure gas, as shown in FIG. 16. Further it is possible to fabricate a pure gas manufacturing apparatus for obtaining a large amount of gas by superimposing a number of pure gas permeable membranes 18, and supporting members 15 in layers as in FIG. 17 while holding metallic spacers 11 between the membranes and supporting members and welding while under compression.

EXAMPLE 2

Using two pure hydrogen permeable membranes of palladium alloy as in Example 1, having a thickness of 0.1 mm., diameter of 160 mm., wave pitch of 2 mm., an effective permeating area of 261 cm.$^2$ and shaping them into continuous wave form membranes having a mean thickness of 0.067 mm., a pure hydrogen permeating separator assembly was fabricated and constructed into an apparatus as shown in FIG. 18.

A test for confirming durability against reversed pressure was conducted. While making the charging side pressure atmospheric, and applying reversed pressure of 20 kg./cm.$^2$ on the pure hydrogen side by nitrogen, the pure hydrogen permeating separator, fabricated as above-mentioned was left to stand for 24 hours at a temperature of 450°±5° C., and neither deformation nor damage of the assembly was observed. This test indicates that the pure hydrogen permeable membrane of the present invention withstands reversed pressure even when it is brought under the reversed pressure by mistake at high temperature.

A test of pure hydrogen separation from ammonia synthesis gas was conducted.

500 l./hr. (calculated at atmospheric pressure) of ammonia synthesis gas composed of 22.7 volume percent $N_2$, 75.3 volume percent $H_2$, 1.8 volume percent $CH_4$, and 0.2 volume percent $O_2$, were charged as a raw gas, to the above-mentioned pure hydrogen permeating separator assembly at a charging pressure of 10 kg./cm.$^2$. The temperature of palladium alloy membranes was maintained at 450°±5° C., and 210 l./hr. (calculated at atmospheric pressure) of impure gas were purged while 290 l./hr. of pure hydrogen (calculated at atmospheric pressure) were obtained. Nitrogen concentration of the purged gas was 54.0 volume percent and purity of the hydrogen was 99.99999 volume percent.

EXAMPLE 3

Employing supporting members whose surfaces contacting the permeable portion and clamping portion of pure hydrogen permeable membrane are coated with various materials, the pure hydrogen permeating assembly of FIG. 21 was constructed. The composition and the dimensions of the membrane were as follows:

Composition: palladium alloy of Example 1
Diameter: 70 mm. $\phi$
Diameter of permeating part: 60 mm. $\phi$
Shape of permeating part: an 0.08 mm. thickness membrane are shaped into a 2 mm. pitch waveform membrane.
Width of clamping part: 5 mm.

The apparatus was tested by evacuating the raw gas feed side and discharge side of the pure hydrogen permeating assembly to $1 \times 10^{-3}$ mm. Hg, while charging the heaters with electric current to heat the pure hydrogen permeating assembly up to 450° Thereafter a temperature of 450±5° C. was maintained while compressed raw hydrogen gas was fed at a pressure of 10 kg./cm.$^2$ from the raw hydrogen inlet. When a part of the raw hydrogen gas was purged from the impure gas outlet, only pure hydrogen permeated the pure hydrogen permeable membrane and 55 l./hr. of pure hydrogen were obtained from the pure hydrogen passage conduit. After 8 hours, the feed of raw hydrogen gas was stopped, the raw hydrogen feed side and the pure hydrogen take out side were evacuated, and the electric current was switched off from the heater at the degree of vacuum of $1 \times 10^{-3}$ mm. Hg. After standing 6 hours to cool, the separator assembly was dismantled and the condition of the joint between the pure hydrogen permeable membrane and the surface of the supporting members was examined. The following results were obtained:

| The surface of support | Coating | Adhering condition of pure hydrogen permeable membrane to the surface of support |
|---|---|---|
| The surface contacting with the permeable portion of pure hydrogen permeable membrane. | Cr | Not adhering. |
| | Mo | Do. |
| | W | Do. |
| | Ti | Do. |
| | Zr | Do. |
| | Hf | Do. |
| | Al | Do. |
| | $Al_2O_3$ | Do. |
| | No coating but the support surface is 18–8 stainless steel. | Slightly adhered. |
| | No coating but the support surface is monel metal. | Completely adhered. |
| The surface contacting with the clamping part of pure hydrogen permeable membrane. | Au | Joint is complete, no leakage. |
| | Ag | Do. |
| | Cu | Do. |
| | Ni | Do. |
| | Co | Do. |
| | Fe | Do. |

What is claimed is:

1. An apparatus for separating a pure gas from a mixture of gases which comprises a membrane permeable to said pure gas carried on one surface of a pressure resistant support member, means for supplying said mixture of gases to the unsupported side of said membrane and means for purging said pure gas from the supported side of said membrane, said membrane being of substantially equal thickness throughout and having a wave form cross-section, said support member being provided with gas conduits which terminate on said one surface and which are in fluid communication with said membrane, at least one portion of said membrane being sealably mounted on said support member and at least one other portion of said membrane being freely carried on said support member, the surface of said support member in contact with said sealably mounted portion of the membrane being coated with a member selected from the group consisting of silver, copper, nickel, cobalt and iron and the surface of said support member in contact with said freely carried portion of the membrane being coated with a member selected from the group consisting of chromium, molybdenum, tungsten, titanium, zirconium, hafnium, aluminum and oxides thereof.

2. The separator of claim 1 wherein the membrane is formed from a palladium alloy.

3. The separator of claim 1 wherein the membrane is formed from a silver alloy.

4. The separator of claim 1 wherein the support member is formed from a metal and the diameter of the gas conduits in said member is shorter than the pitch of the associated wave form of said membrane.

5. The separator of claim 1 wherein the support member is formed from a gas permeable material selected from the group consisting of sintered metal and porcelain.

6. An apparatus for separating a pure gas from a mixture of gases which comprises: two membrane assemblies, each of said assemblies comprising a membrane permeable to said pure gas carried on one surface of a pressure resistant support member, said membrane being of substantially equal thickness throughout and having a wave form cross-section, said support member being provided with conduits in fluid communication with said membrane; a gas impermeable annular packing member, said two assemblies being sealably mounted on opposing sides of said packing member to form a chamber with the unsupported sides of the membranes of said assemblies facing inwardly of said chamber; means for charging said mixture of gases to said chamber, means for purging non permeated gas from said chamber and means for collecting permeated pure gas from the supported sides of said membranes outside of said chamber.

7. An apparatus for separating a pure gas from a mixture of gases which comprises: two membrane assemblies, each of said assemblies comprising a membrane permeable to said pure gas carried on one surface of a pressure resistant support member, said membrane being of substantially equal thickness throughout and having a wave form cross-section, said support member being provided with conduits in fluid communication with said membrane; a gas impermeable spacing member having concave top and bottom surfaces, one of said assemblies being peripherally sealably mounted at the top of said spacing member to form a first chamber and the other of said assemblies being peripherally sealably mounted at the bottom of said spacing member to form a second chamber, the unsupported sides of the membranes in said assemblies facing inwardly of said chambers and said spacing member having a plurality of conduits in fluid communication with said first and second chambers; means for charging said mixture of gases to one of said chambers; means for purging non permeated gas from the other of said chambers; and means for collecting permeated pure gas from the supported sides of said membranes outside of said chambers.

References Cited

UNITED STATES PATENTS

| 2,824,620 | 2/1958 | De Rosset | 55—16 |
| 2,924,630 | 2/1960 | Fleck et al. | 55—16 |
| 2,982,416 | 5/1961 | Bell | 210—321 |
| 3,144,313 | 8/1964 | Pfeffeale | 55—16 |

FOREIGN PATENTS

| 1,328,826 | 4/1963 | France. |

REUBEN FRIEDMAN, Primary Examiner

J. W. ADEE, Assistant Examiner